(No Model.)
J. PALMER.
MEANS FOR LUBRICATING ROLLS OF LEATHER FINISHING MACHINES.
No. 501,657. Patented July 18, 1893.
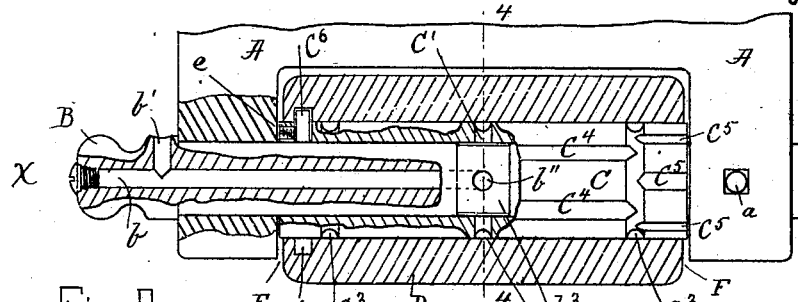
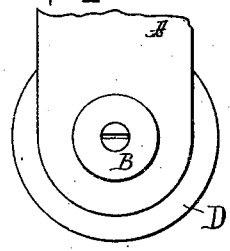
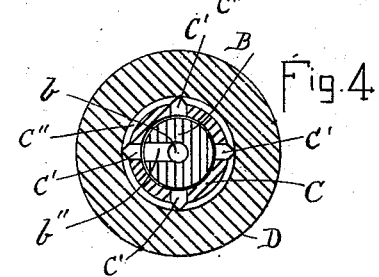
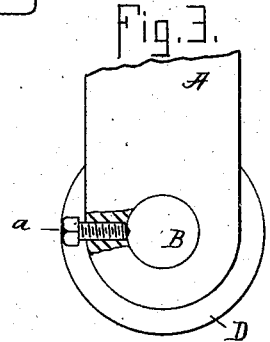
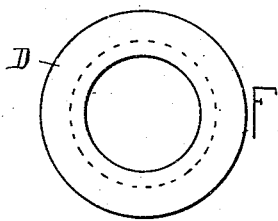
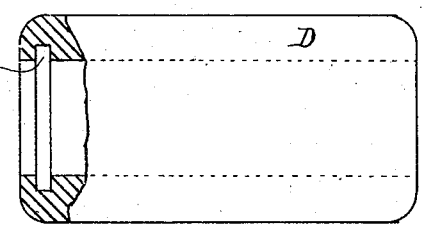
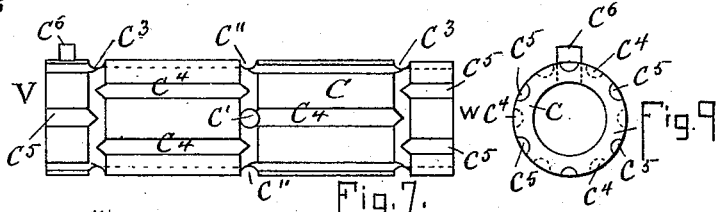
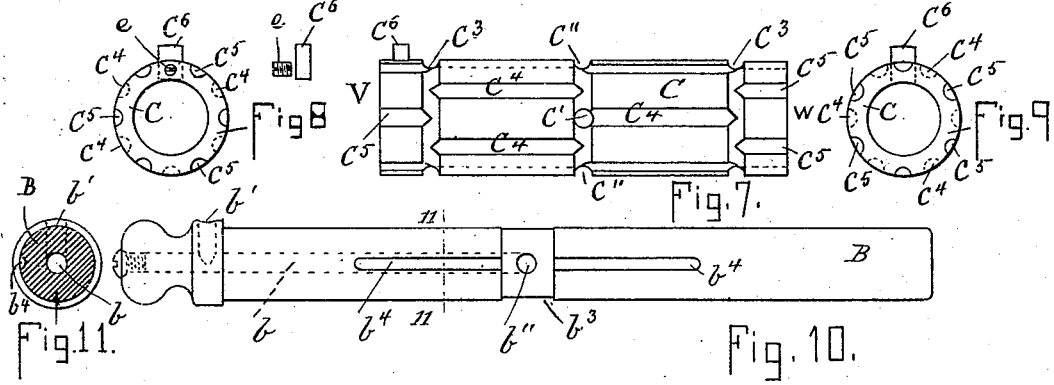
WITNESSES
Eugene E. Wood
S. J. Craddock
INVENTOR
John Palmer
by Alban Andrew
his atty.

UNITED STATES PATENT OFFICE.

JOHN PALMER, OF WOBURN, MASSACHUSETTS.

MEANS FOR LUBRICATING ROLLS OF LEATHER-FINISHING MACHINES.

SPECIFICATION forming part of Letters Patent No. 501,657, dated July 18, 1893.

Application filed May 1, 1893. Serial No. 472,478. (No model.)

*To all whom it may concern:*

Be it known that I, JOHN PALMER, a citizen of the United States, and a resident of Woburn, in the county of Middlesex and State of Massachusetts, have invented new and useful Improvements in Means for Lubricating Rolls of Leather-Finishing Machines, of which the following, taken in connection with the accompanying drawings, is a specification.

This invention relates to improvements in rolls for leather finishing machines such as for instance, graining, glossing, glazing, polishing, pebbling or stoning machines and it has for its object a thorough and uniform lubrication of the roller in its bearing as well as to permit circulation of air in the roller bearing so as to keep it cool, thus allowing it to be run at greater speed with an increased capacity of work as compared with other rollers for this purpose. The cylindrical external surface of the roll is to be made smooth or provided with any desired pattern or configuration according to the purpose for which it is to be used.

The invention is carried out as follows, reference being had to the accompanying drawings, wherein—

Figure 1 represents a central longitudinal section of the improved roll partly shown in elevation. Fig. 2 represents an end view of the same seen from X in Fig. 1. Fig. 3 represents a similar end view seen from Y in Fig. 1. Fig. 4 represents a cross-section on the line 4—4 in Fig. 1. Fig. 5 represents a side elevation of the roll partly shown in section. Fig. 6 represents an end elevation of said roll. Fig. 7 represents a side elevation of the lubricator and air circulator sleeve. Fig. 8 represents an end view of said sleeve as seen from V in Fig. 7. Fig. 9 represents an end view of said sleeve as seen from W in Fig. 7. Fig. 10 represents a side elevation of the spindle; and Fig. 11 represents a cross-section on the line 11 shown in Fig. 10.

Similar letters refer to similar parts wherever they occur on the different parts of the drawings.

A in Figs. 1, 2 and 3 represents a portion of the jack head attached to the swinging pendulum of a leather polishing or similar machine as usual. In end perforations in said head is located a spindle B which is secured to said head preferably by means of a set screw $a$ as shown in Figs. 1 and 3. The spindle B has a central perforation $b$ communicating with a filling opening $b'$ arranged on said spindle outside of one of its bearings; said central perforation terminating about midway in said spindle where it communicates with a lateral side perforation $b''$ where a recessed annular groove $b^3$ is made on said spindle as shown in Figs. 1 and 10. Upon the spindle B is loosely journaled the lubricator and air circulating sleeve C having one or more lateral perforations $C'$, $C'$, adapted to coincide with the spindle perforation $b''$ as fully shown in Figs. 1, 4 and 7.

About midway on the sleeve C is an external annular groove $C''$ communicating with the lateral perforations $C'$, $C'$, and near the ends of said sleeve are similar external annular grooves $C^3$, $C^3$ as shown in Figs. 1 and 7.

$C^4$, $C^4$, are longitudinal grooves on the outside of the sleeve C by means of which communication is established between the middle annular groove $C''$ and end grooves $C^3$, $C^3$ as shown in Figs. 1, 7, 8 and 9. The groove $C^4$ on one side of the annular groove $C''$ are alternately arranged between the corresponding grooves $C^4$ on the other side of said annular groove $C''$ as shown in Fig. 7.

$C^5$, $C^5$ are longitudinal grooves on the exterior of the sleeve C going from the annular grooves $C^3$, $C^3$ to the ends of said sleeves as fully shown in Figs. 1, 7, 8 and 9.

$b^4$, $b^4$, are longitudinal grooves on the exterior of the spindle B, which extend from the annular recess $b^3$ a suitable distance on each side of the latter as shown in Figs. 10 and 11.

D is the hollow cylindrical roll (which may be smooth or provided with a suitable pattern or figure on its exterior according to the purpose for which said roll is used) said roll being journaled on the lubricator sleeve C and free to turn on the latter as the said roll is moved with proper pressure against the leather that is being acted upon; for the purpose of preventing the said roll from moving longitudinally on the sleeve C, I secure to one end of the latter a radially projecting key $C^6$ adapted to enter and fit loosely within an internal annular groove $d$ on the roll D as shown in Figs. 1, 5, 6, 7, 8 and 9. In practice said key $C^6$ is pushed from the inside of the sleeve C through a perforation in the side of the latter into the groove $d$ before the spindle B is put through the said sleeve, after which the key $C^6$ is secured in place preferably by means of a set screw $e$ going through the end of said sleeve C as fully shown in Figs. 1 and 8.

The sleeve C is made of a length equal to the distance between the inner surfaces of the bearings of the head A, and with a loose fit to permit said sleeve to rotate freely on its spindle B. The roll D however is made somewhat shorter so as to leave spaces F, F, between the ends of said roll and the bearings in the head A for the purpose of allowing the air to enter through such spaces and to circulate through the grooves on the exterior of the sleeve C between the latter and the internal portion of the roll D, thereby cooling off said parts and preventing them from overheating during the rotation of said roll D and its sleeve C.

The device is lubricated by introducing the lubricant through the orifice $b'$ from which it flows into the central channel $b$ and from the latter through its side opening $b''$ into the recessed spindle portion $b^3$ from which it passes into spindle grooves $b^4, b^4$ by which the spindle B is lubricated relative to the interior of the sleeve C. From the recessed spindle portion $b^3$ the lubricant passes through the sleeve perforations C' into the annular grooves C'', $C^3$, $C^3$, and longitudinal passages $C^4, C^5$, on the exterior of the sleeve C by which the latter is properly lubricated in its bearing in the bore of the roll D, thus causing all the running parts to be kept uniformly lubricated without waste of the lubricant.

Whenever it is desired for any purpose to change the roll D and substitute it for another, this can easily be done by releasing the set screw $a$ and withdrawing the spindle B from its bearings, removing the roll from its sleeve and placing another thereon and inserting the spindle through the sleeve C and the bearings on the head A and securing it to the latter as before.

Having thus fully described the nature, construction, and operation of my invention, I wish to secure by Letters Patent and claim—

1. The herein described roll for finishing leather consisting of a head and secured to it a spindle having central oil chamber and exit opening leading therefrom combined with a lubricator and air circulating sleeve journaled on said spindle and having lateral perforations, annular grooves and alternately arranged longitudinal channels, said roll being journaled on said sleeve, substantially as and for the purpose set forth.

2. The herein described roll for finishing leather consisting of a chambered spindle secured to the head of the machine and having a recessed portion, an oil exit, and longitudinal oil channels combined with a lubricating and air circulating sleeve journaled on said spindle and having lateral perforations, grooves and alternating longitudinal channels, said roll being journaled on said sleeve and means for preventing longitudinal movement of said roll relative to its sleeve, substantially as and for the purpose set forth.

In testimony whereof I have signed my name to this specification, in the presence of two subscribing witnesses, on this 24th day of April, A. D. 1893.

JOHN PALMER.

Witnesses:
ALBAN ANDRÉN,
EUGENE E. WOOD.